United States Patent [19]
Baizer

[11] 3,876,514
[45] Apr. 8, 1975

[54] ELECTROLYSIS OF ALLYL HALIDES
[75] Inventor: Manuel M. Baizer, Creve Coeur, Mo.
[73] Assignee: Monsanto Company, St. Louis, Mo.
[22] Filed: Dec. 6, 1971
[21] Appl. No.: 205,336

[52] U.S. Cl............... 204/59 R; 204/72; 260/680 R
[51] Int. Cl. .......................... C07b 29/06; C07c 3/00
[58] Field of Search ............................. 204/59 R, 72

[56] References Cited
UNITED STATES PATENTS
3,390,066   6/1968   Baizer.................................... 204/72

FOREIGN PATENTS OR APPLICATIONS
1,145,372   3/1969   United Kingdom................... 204/72
186,398   10/1966   U.S.S.R................................. 204/72

Primary Examiner—F. C. Edmundson

[57] ABSTRACT

The electrolysis of allyl halides to 1,5-hexadienes.

14 Claims, No Drawings

ELECTROLYSIS OF ALLYL HALIDES

BACKGROUND OF THE INVENTION

The present invention relates to the preparation of biallyl compounds. In particular the invention relates to the electrolytic reductive dehydrohalogenation and coupling of allyl halides to produce biallyl compounds.

Diene compounds such as 1,5-hexadiene are well known commodity chemicals useful in the production of compounds such as hexamethylene diamine, which is a nylon intermediate. Hexadiene can be produced by a variety of procedures, among others by the catalytic coupling of propylene. This latter procedure is generally satisfactory. However, it generally involves fairly high fixed capital costs, which may tend toward high unit costs for all except large scale operations. Therefore it would be advantageous to have a route with lower or competitive costs for more moderate production capacity, or, in any event, to have some alternate routes to 1,5-hexadiene.

It has previously been known that alkyl halides can be coupled with dehalogenation at the cathode (L.V. Kaabak et al., J. Org. Chem. U.S.S.R., Vol. 3, page 1 (1967)). Similar reactions with some other halides are also known. However, the reactions with the electrolysis of the alkyl halides requires fairly high (negative) cathode voltages, and in general gives rather poor yields. Moreover, the processes do not involve use of an unsaturated halide to give a 1,5-diene product.

SUMMARY OF THE PRESENT INVENTION

The present invention involves the electrolysis of β-olefinic halides at the cathode to produce α-ε-dienes. The reaction involves a dehalogenation and coupling reaction, with retention of the olefinic bonds. When allyl halide is the reactant, the product is 1,5-hexadiene, i.e., a diene with the double bonds on the terminal positions. The fact that double bonds in the product are in terminal positions is very significant, as the 1,5-hexadiene is a recognized nylon intermediate, subject to conversion to hexamethylene dibromide by non-Markownikoff addition of hydrogen bromide. The position isomers of 1,5-hexadiene are not readily isomerized to 1,5-hexadiene, and the isomers themselves are not amenable as nylon-6,6 intermediates, and related types of nylons are inferior, or at least not generally sought.

The process of the present invention can be illustrated:

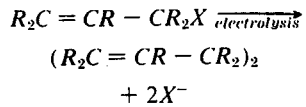

$(R_2C = CR - CR_2)_2$ $+ 2X^-$ in which $X$ is halide and in which the $R$'s are individually selected from hydrogen and monovalent organic radicals. The $R$'s will generally be selected so as not to interfere in the reaction, and will preferably be hydrogen or hydrocarbyl, for example a saturated aliphatic hydrocarbyl group, although a hydrocarbyl group containing only aromatic unsaturation, or non-activated olefinic unsaturation will not usually interfere. The $R$'s substituted on the carbon atoms of the olefinic group will not generally be such electron withdrawing groups as cyano, carbalkoxy, etc., as such groups in such position tend to activate the olefinic bond and cause reductive coupling reactions at the olefinic bond upon reduction at the cathode. However, the presence of relatively inert groups on or in such hydrocarbyl groups will not generally interfere in the desired electrolysis, e.g., ether groups are suitable. The reactants of practical interest for reductive dehalogenation and dimerization will generally contain up to 20 or so carbon atoms, and usually less than 10 carbon atoms, and accordingly the number or size of the hydrocarbyl substituents will usually be limited. $R$ can be such groups, for example, as alkyl, aryl, hydrogen, methyl, ethyl, propyl, isopropyl, butyl, hexyl, phenyl, 2-ethylphenyl, benzyl, phenylethyl, etc. Compounds suitable for use herein include, for example, allyl chloride, allyl fluoride, allyl bromide, allyl iodide, crotyl chloride, crotyl iodide, crotyl bromide, 2-pentenyl chloride, 2-hexenyl chloride, methallyl chloride, 1-methyl-2-propenyl chloride, etc. The fluoride ion is generally less labile than the other halides and will require more negative discharge potentials, but can be employed if other electrolysis components are suitable for use under the discharge conditions without undue interference, but use of fluorides is not apt to be of any practical significance.

It will be noted that the unsaturation in the reactants is in the 2-, or allyl position with respect to the halide substituent, i.e., the halide is on a carbon atom adjacent to the double bond. In general most of the reactants are 2- or β-alkenyl halides, and the electrolysis produces α, ε-alkadienes. The allyl or alkenyl halides will generally be employed as exemplifications herein.

The reaction of most interest in the present invention is the conversion of allyl halide itself to 1,5-hexadiene

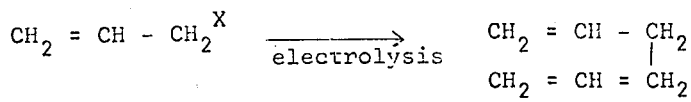

In the case of substituted allyl halides, there may be tautomerism of the intermediates involved, with consequent production of isomeric products. For example, from the electrolysis of crotyl chloride, three products can be produced:

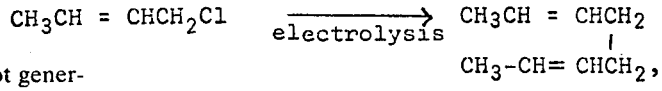

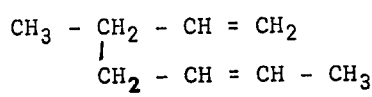

In each product the double bonds have the same relative position, having four carbon atoms between them, i.e., the products can be designated as substituted α, ε-dienes.

Two different allylic reactants can be employed in the present process to give cross-coupled products and such is included in the present reductive dehalogenation and coupling invention. For example, electrolysis of a mixture of crotyl and allyl chloride can give 1,5-heptadiene, and isomers thereof, along with octadienes and hexadienes. The procedure can be directed toward the cross-coupled product by control of the cathode voltage and the relative concentrations of the allylic reactants.

The electrolysis is carried out by passing an electric current through the 2-alkenyl halide in contact with a cathode. The alkenyl halide or the medium in which it is employed must have sufficient conductivity to conduct the electrolysis current. While media of poor conductivity can be employed, it is preferred from an economics standpoint not to have too high a resistance. The required conductivity is generally achieved by employing common supporting electrolytes, such as electrolyte salts of sufficiently negative discharge potentials, usually along with a liquid having a fairly good dielectric constant. Electrolyte salts in general have poor solubility in alkenyl halides, and it is desirable to employ a non-aqueous solvent along with the alkenyl halide to aid in the solution or dispersion of the electrolyte. In general any combination of electrolyte and solvent can be employed which gives the desired conductivity and is sufficiently compatible with the alkenyl halide to permit its electrolysis. It is generally desirable to have the electrolyte, alkenyl halide and solvent in a fairly homogeneous dispersion, but a true solution is not necessarily required as, for example, many quaternary ammonium salt solutions may, in some respects, be dispersions rather than true solutions. Thus the present invention may use emulsions as well as true solutions. Moreover in emulsions or media having more than one phase, electrolyses can occur in a solution of the components in one of the phases.

Aside from the conditions necessary for the desired electrolysis, the electrolysis will generally be conducted under conditions which do not facilitate non-electrolytic side-reactions. 2-Alkenyl halides are, of course, characterized by relatively labile halide ions, and are therefore subject to hydrolytic and similar reactions. Moreover, various agents are capable of adding to the olefinic bond under suitable conditions. These considerations do not ordinarily present any difficulty when the usual electrolyte salts and non-aqueous electrolysis media are employed. The desired reaction does not involve hydrogenation or other reduction of the olefinic bonds, and is not conducted under conditions to promote such reactions. There is no need in the present process for the presence of water or similar proton donors, and under the conditions employed there is ordinarily no observation of hydrogen generation, and the reaction can be conducted with, at most, a very minor amount of reduction of the olefinic bonds in the reactant.

In the solvents employed herein, it will generally be desirable to select a solvent of fairly high dielectric constant in order to lower the electrical resistance. Of course, the choice and concentration of electrolyte salts can also be used to lower the electrical resistance. Solvents desirable for use herein include, for example, dimethylformamide, acetonitrile, hexamethylphosphoramide, etc. Methylene chloride can be used, but its conductivity is poor. In general it is desirable to employ a solvent with a dielectric constant of at least 25, and preferably of at least 50.

The present reaction does not require any source of protons to avoid polymerizations, as tends to be necessary with some reductive dimerizations of olefinic compounds. This was not readily foreseen since the same type of radical intermediate can be postulated for allyl chloride, as apparently is involved in electrolytic polymerization of acrylonitrile, for example. In any event, protons are apparently unnecessary in the present process, so it is not necessary to employ solvents which donate protons, or to work out the control of the concentrations of such solvents to avoid protonation of intermediates in competition with the desired coupling reaction. However, if desired for some reason, water or other proton donors can be employed if proper small concentrations are used, and particularly if high concentrations of quaternary ammonium salts are employed. The quaternary ammonium salts apparently have some effect in protecting intermediates developed at the electrode surface from protonation.

With the electrolyte and solvent materials usually employed, the catholyte will generally be approximately neutral, so far as acidity-basicity is concerned, and no particular provisions are necessary to regulate this parameter. However, it will usually be desirable to operate under near neutral conditions in order to avoid possibly promoting hydrolytic or other side reactions, or protonation of intermediates. In long term continuous reaction with re-use of catholyte media, it may be desirable to use buffers or to adjust pH periodically to desired values. Such considerations may be of minor significance since the electrolysis in non-aqueous media does not generally involve discharge of hydroxyl ions or generation of protons, and pH measurements are not particularly appropriate for such media.

In carrying out the present process, a supporting electrolyte is generally used to enhance conductivity. With some combinations of allyl halides and solvents, an additional electrolyte may not actually be necessary, but in practice a supporting electrolyte is utilized in the present invention. A supporting electrolyte, as understood by those in the art, is an electrolyte capable of carrying current but not discharging under the electrolysis conditions. In the present invention this primarily concerns discharge at the cathode, as the desired reaction occurs at the cathode. Thus the electrolytes employed will generally have cations of more negative cathodic discharge potentials than the discharge potential of the allyl halide used. An electrolyte with a similar or slightly lower discharge potential than the allyl halide may be operative to some extent, but yields and current efficiency are adversely affected, so it is generally desirable to avoid any substantial discharge of the electrolyte salt during the electrolysis. Different halogens in the olefinic reactant will ordinarily result in different discharge potentials, with the iodide being less negative than the bromide, which is less negative than the chloride. It will be recognized that discharge potentials will vary with cathode materials and their surface condition, and various materials in the electrolysis medium, and it is only necessary to have an effective reduction of the allyl halide under the conditions of the electrolysis, and some salts may be effective supporting electolytes under such conditions even though nominally of less negative discharge potential than the allyl halide employed.

In general any supporting electrolyte salts can be utilized in effecting the present process, with due consideration to having conditions suitable for the discharge of the allyl halide involved. The term salt is employed in its generally recognized sense to indicate a compound composed of a cation and an anion, such as produced by reaction of an acid with a base. The salts can be organic, or inorganic, or mixtures of such, and composed of simple cations and anions, or very large complex cations and anions. Amine and quaternary ammonium salts are generally suitable for use herein, as such salts generally have very negative discharge potentials. Certain salts of alkali and alkaline earth metals can also be employed to some extent, although more consideration will have to be given to proper choice of the allyl halide in order to achieve a discharge, with the use of the bromide or iodide being advisable in some cases, depending upon the cation discharge potential. Among the quaternary ammonium salts useful, are the tetraalkyl ammonium, e.g., tetraethyl or tetramethyl ammonium, methyltriethylammonium, etc., heterocyclic and aralkyl ammonium salts, e.g., benzyltrimethylammonium, etc. Various anions can be used with the foregoing and other cations, e.g., organic and inorganic anions, such as acetates, phosphates, halides, sulfates, sulfonates, alkylsulfates, etc. Aromatic sulfonates and similar anions, e.g., p-toluenesulfonates, including those referred to as McKee salts, can be used, as can other hydrotropic salts, although the hydrotropic property may have no particular significance when employed in non-aqueous media herein. It will be desirable to have some material present which is capable of a non-interfering discharge at the anode, such as some portion of a halide salt, in order that current can be carried without producing interfering contaminants. However, after initial electrolysis, the halide ion liberated from the allyl chloride can migrate to the anode and be discharged there and most salt anions will not thereafter be subject to discharge at the anode. In general the salts disclosed in my U.S. Pat. No. 3,390,066 as suitable for hydrodimerization of certain allyl compounds, can also be employed in the present process, although the solubility considerations for the aqueous media there discussed are not essential to the present process. The concentration of salts, when used, can vary widely, e.g., from 0.5 to 50% or more by weight of the electrolysis medium, but suitable concentrations will often be in the range of 5 to 15% by weight. With some simple salts, such as lithium halides, a lower percentage may be preferred. If it is desired to have all the components in solution, the amount of salt utilized will then be no greater than will dissolve in the electrolysis medium.

In some cases under some conditions there may be advantages in using simple salts, such as lithium salts, and results may be comparable to or better than those obtainable with more complex salts. However, for general applicability and suitability at strongly negative discharge conditions, quaternary ammonium salts, or salts which discharge at more negative potentials than −2.2 cathodic volts versus the saturated calomel electrode, are preferred.

The concentrations of allyl halide can vary widely, e.g., constituting most of the electrolysis medium (save for electrolyte salt) if no solvent is used, or being present in very dilute solution. In general the allyl halide will be in the range of about 0.5 to 50% by weight of the electrolysis medium, and often in the range of 5 to 15% by weight. In continuous processes, the allyl halide concentration will probably be maintained close to some constant value, and the diene product will also be present in fair amount in the electrolyte, depending upon the conversion attained as determined by the timing and amount of product separation. For example, the process can be operated at conversions of 20 to 60% or so (or other desired rates), and the unreacted allylic component recycled.

In effecting the present process when only an anionic route is available, the cathode potential will have to be sufficient to achieve reaction by such route. When both radical and anionic routes are available, the control of the cathode voltage can have considerable influence upon the course of the reaction. With allyl chloride, in the absence of bromide ion, the electrolysis will generally be conducted at cathode voltages (vs. saturated calomel electrode) at least as negative as −1.8 and possibly as or more negative than −2.25. To achieve the discharge, it is not necessary to actually reach the half-wave potential, as the discharge will start at somewhat lower potentials, with increasing current up to and beyond the half-wave potential. With allyl bromide, either radical or anionic routes appear available. At potentials at or more negative than −1.8, it appears than an anionic course is followed (by taking up two electrons), while at less negative potentials, there may be radicals formed (by taking up one electron) which form intermediate compounds with the electrode, particularly when a mercury electrode is used. While there are possible explanations for variations in yield found, there may be advantages in the use of conditions to effect an anionic route, that is, to add two electrons to the allyl halide at the cathode.

Various current densities can be employed in the present process. It will be desirable to employ high current densities in order to achieve high use of electrolysis cell capacity, and therefore for production purposes it will generally be desirable to use as high a density as feasible, taking into consideration sources and cost of electrical current, resistance of the electrolysis medium, heat dissipation, effect upon yields, etc. Over broad ranges of current density, the density will not greatly affect the yield. Suitable ranges for operation will be in ranges from a few amperes/square decimeter of cathode surface, up to 10 or 100 or more amperes/decimeter.

The present electrolysis can be conducted in the various types of electrolysis cells known to the art. In general such cells comprise a container made of material capable of resisting action of electrolytes, e.g. glass or plastics, and a cathode and anode, which are electrically connected to sources of electric current. The anode can be any electrode material so long as it is relatively inert under the reaction conditions. Ordinarily the anode will have little or no influence on the course of the electrolysis, and can be selected so as to minimize expense and any corrosion or erosion problem. Any suitable materials can be employed as the cathode, various metals, alloys, graphite, etc. being known to the art. However, the cathode materials can have some effect upon the ease and efficiency of the reaction. The half-wave discharge potential of allyl halides will vary with the electrode material, and ordinarily the electrolysis will be facilitated by employing electrodes in the lower ranges of discharge potentials. However, it should be noted that performance of the materials can be greatly affected by surface characteristics, alloying, or impurities, e.g. stainless steel gives different half-wave potentials than iron. Aluminum appears to require a very negative discharge potential, and apparently would require use of some especially difficulty reducible electrolyte. Many of the suitable metals will exhibit half-wave potentials with allyl bromide less negative than −1.8 volts. For production purposes mercury or various metals coated with amalgams may be well suited, and lead, stainless steel, etc. and their alloys may also be good choices.

In the present process a divided cell will ordinarily be employed, i.e., some separator will prevent the free-flow of reactants between cathode and anode. Generally the separator is some mechanical barrier which is relatively inert to the electrolyte materials, e.g., a fritted glass filter, glass cloth, asbestos, porous polyvinyl chloride, etc. An ion exchange membrane can also be employed. The desired reduction will occur in an undivided cell, but a difficulty is presented in recovery of product without substantial interference from subsequent reactions, under ordinary conditions. For example, halogen is generated at the anode, and the halogen can halogenate the olefinic bonds of the biallyl. This can possibly be prevented by such expedients as adding an olefin, e.g., propylene, near the anode to trap the halogen generated there, or by designing cells with electrolyte flow appropriate to keep halogen from the vicinity of the cathode.

When a divided cell is used, it will be possible to employ the same electrolysis medium on both the cathode and anode sides, or to employ different media. Ordinarily it will be desirable to employ the same salt and solvent, with possible addition of some halide salt to the anolyte if not already present, to provide an initial source of halide for discharge. In some circumstances it may be advisable to employ a different anolyte, for economy of materials, lower electrical resistance, etc.

The electrolysis cells described in the procedural Examples herein are primarily for laboratory demonstration purposes. Production cells are usually designed with a view to the economics of the process, and characteristically have large electrode surfaces, and short distances between electrodes. The present process is suited to either batch or continuous operations. Continuous operations can involve recirculation of a flowing electrolyte stream, or streams, between electrodes, with continuous or intermittent sampling of the stream for product removal. Similarly, additional reactants can be added continuously or intermittently, and salt or other electrolyte components can be augmented, replenished, or removed as appropriate. Additional description of a suitable cell for continuous operation is set forth in U.S. Pat. No. 3,194,480 of the applicant and others.

The products obtained in the present process can be readily recovered from the catholyte. A chromatographic analysis has been used for convenient separation and identification in the procedural Examples herein. However, for production purposes, a separation by distillation will generally be most efficient and suitable. For example, allyl chloride has a reported boiling point of 44.5°C., 1,5-hexadiene of 59.5°C., while solvents such as dimethylformamide are much higher boiling. Thus the allyl chloride and hexadiene can be readily flash distilled from the catholyte, and the allyl chloride can then be distilled from the 1,5-hexadiene. In a continuous procedure, the allyl chloride tops from a distillation column can be recycled to the electrolysis.

The electrolysis can be conducted at ambient temperatures, or at higher or lower temperatures. If allyl chloride is utilized, it is desirable to avoid elevated temperatures so that the volatile reactant will not escape, and various cooling means can be used for this purpose. Cooling to ambient temperatures is sufficient, but if desired temperatures down to 0°C. or lower can be employed. The amount of cooling capacity needed will depend upon the cell resistance and the electrical current drawn. If desired cooling can be effected by permitting a component, such as allyl chloride, to reflux through a cooling condenser. Pressure can be employed to permit electrolysis at higher temperature with volatile reactants, but unnecessary employment of pressure is usually undesirable from an economic standpoint.

The present electrolysis is not particularly sensitive to atmospheric effects, and it is not necessary to utilize an inert atmosphere or the like. Residual oxygen, extraneous moisture, etc., can be removed from the reactants and solvents before commencing the reaction, but this is not an essential precaution. Oxygen is subject to reduction to hydroxyl ion, which could have some hydrolytic effect. There is no apparent tendency toward polymerization in the electrolysis, but, if desired, polymerization inhibitors, such as those for inhibiting free radical polymerization, e.g., quinones, can be present. Of course, caution should be exercised against any excessive presence of proton donors.

In the present process, halogen is ordinarily generated at the anode. It may be feasible to recover this halogen with resulting advantage to the economics of the process. One possibility is the addition of some olefin to the anolyte to produce a dihalide. This is feasible, although the products so obtained may not be of especially high value. Another variation is to use the anode side to produce allyl chlorides from olefines. For example, propylene can be converted to allyl chloride:

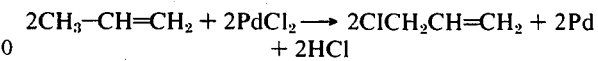

By conducting this reaction at the anode, and utilizing the halide ions which have migrated from the catholyte, the PdCl$_2$ can be regenerated:

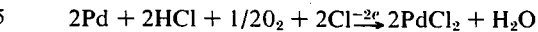

The allyl chloride can then be used as reactant on the cathode side, and net result is the conversion of propylene to biallyl. The biallyl, i.e., 1,5-hexadiene, can be readily hydrobrominated to hexamethylene dibromide, which can then be amidated to hexamethylene diamine. Thus the present invention provides a route from propylene to hexamethylene diamine. If desired, the step from propylene to allyl halide can be effected by known halogenation procedures other than that described hereinabove. For the production of nylon it is important to have hexamethylene diamine relatively free of isomers, and by the foregoing route it is possible to achieve such hexamethylene diamine without taking unusual precautions to separate isomers in the production of the product and its precursors. The electrolysis can be conducted to produce the 1,5-hexadiene with substantial absence of isomers.

In electrolytic reactions of alkyl halides to prepare alkane dimers, the yields tend to be low. In the present process, possibly due to the lability of the halogen atom, the yields are good. It is feasible to obtain yields of 75% or so based on current input, and by optumumization it may be possible to obtain yields that are nearly quantitative.

EXAMPLE 1

A catholyte was prepared containing 3.85 grams allyl chloride, 10 grams tetraethylammonium p-toluenesulfonate and an amount of dimethylformamide to make 60 ml. It was placed in an electrolysis cell with an anolyte composed of 8 grams tetraethylammonium p-toluenesulfonate, 1.2 grams tetraethylammonium chloride, 1 ml. decene-1, and dimethylformamide to make 75 ml. A divided electrolysis cell was employed in which the anode and cathode compartments were separated by a glass frit. The cathode was a mercury pool in the bottom of the cathode compartment having a surface area of 15.5 cm$^2$. The anode was a rectangular platinum plate of 5.75 cm$^2$ area. The cathode compartment was equipped with a mechanical stirrer and a saturated calomel reference electrode connected to the cathode by a salt bridge. Both cathode and anode sides were equipped with reflux condensers, which were protected by $CaCl_2$ drying tubes. The equipment was dried by heating, and cooled under nitrogen prior to the addition of reactants. Electrolysis was conducted with stirring at a cathode voltage of −1.89 (vs. saturated calomel electrode) and the current declined from an initial 0.28 ampere to 0.03 ampere over eleven hours. The cathode voltage was then changed to −2.25 volts to give an initial current of 0.34 ampere which declined to 0.05 ampere and then to a very low value. The total ampere hours was 1.03. The temperature during the electrolysis was 18° to 25°C. The cell was cooled to 5°C. and the catholyte was transferred to a separatory funnel for separation of mercury. The liquid catholyte was then decanted from some solid tetraethylammonium chloride. The catholyte liquid was then distilled through an 18 inches Vigreaux column, collecting distillate at 35° to 80°C. The distillate which had an amine odor, was shaken with dilute hydrochloric acid, and the top phase decanted away from the aqueous phase. The top phase, a clear white liquid, was analyzed by gas chromatography and found to contain 1.18 grams 1,5-hexadiene (0.0144 mole), for a yield based on current efficiency of 75%.

EXAMPLE 2

An electrolysis of allyl bromide was conducted in the electrolysis cell of Example 1, but the cathode side of the cell was closed, rather than equipped with a condenser. The catholyte was 12.2 grams (0.1 mole) allyl bromide, 10 grams tetraethylammonium p-toluenesulfonate, and dimethylformamide to make 60 ml. The anolyte was 8 grams tetraethylammonium p-toluenesulfonate, 1 gram tetraethylammonium chloride, 1 ml. n-hexene, and dimethylformamide to 75 ml. The hexene was employed to react with free halogen formed. The electrolysis was conducted at a cathode voltage of −1.00 (vs. saturated calomel electrode) with stirring. The catholyte temperature was 20° to 30°C. Samples were taken at intervals for analysis. During the first 40-minute interval, the current varied from 0.140 ampere to 0.168 ampere to 0.096 ampere, and chromatographic analysis indicated a nearly quantitative yield based on current, actually calculated as in excess of theory. The indicated amount of product was 0.136 gram for the 0.089 ampere hour utilized. After about four hours, with an expenditure of 0.425 ampere-hour, the current efficiency to 1,5-hexadiene was 83.1%. About 0.2 ml. water was added to the catholyte, and an additional 0.5 ml. water was added about one-half hour later. The current increased slightly to 0.116 ampere, and the current efficiency during an approximate one hour interval was 23.2%. There were indications from the chromatography that the amount of propylene present increased markedly after the water addition.

EXAMPLE 3

A procedure similar to Example 2 was carried out but employing allyl chloride. A 7.7 gram amount of the allyl chloride was employed, and the other components to make up 60 ml. catholyte as in Example 2. The anolyte was as in Example 2. Electrolysis was begun with the catholyte at 25°C. and with a cathode voltage of −1.50 and current 0.017 ampere. After a few minutes the cathode voltage was raised to −1.845 and the current to 0.12 ampere and maintained near these values for a little less than three hours. A cooling bath was employed to regulate the temperature near 25° to 30°C., and measurements indicated the catholyte became slightly alkaline, while the anolyte became slightly acidic. A sample was taken after about one hour and 0.091 ampere hour, and chromatographic analysis showed 0.118 gram 1,5-hexadiene, for an 85% yield on current efficiency. The yield appeared to decline slightly over the course of a four-hour reaction with an overall expenditure of 0.496 ampere-hour to produce 0.543 gram 1,5-hexadiene for a current efficiency of 72%. The chromatography was carried out on a 10 ft. column of 5% FFAP (free fatty acid phase) and 1% Carbowax 20 M, a waxy solid polyethylene glycol, on Chromosorb G, a Celite diatomaceous earth ceramic.

EXAMPLE 4

Polarography of allyl chloride gives one wave at about −2.3 volts (vs. saturated calomel electrode) in dimethylformamide, while allyl bromide gives two waves at −1.3 and −1.55 volts. The bromide is apparently reduced first to the radical and then to the anion, while with the chloride the radical is apparently immediately reduced, making it appear a two-electron reduction to the anion. Allyl chloride can exchange halide with a bromide source in situ, making it possible to utilize the less expensive allyl chloride and still electrolyze under the less stringent conditions applicable to the bromide and possibly utilizing the radical rather than the anion. A catholyte was prepared from 10 grams tetraethylammonium p-toluenesulfonate, 1 gram tetraethylammonium bromide, 3.85 grams allyl chloride, and dimethylformamide to make 60 ml. The anolyte was 8 grams of the same sulfonate, 1.4 grams tetraethylammonium chloride, 1 ml. decene-1, and 75 ml. dimethylformamide. The cell employed was that described in Example 2. Current was applied to the cell to give a current of 0.001 ampere at −1 cathode volts.

The current was turned off and 3.85 grams additional allyl chloride was added, along with 1 additional gram of the quaternary ammonium bromide salt, which did not all dissolve. Current was applied to give −1.00 cathode volts (vs. saturated calomel electrode) and 0.002 ampere current. At −1.2 cathode volts, the current was 0.007 ampere, and rose to 24 ampere two hours later and −1.3 cathode volts. The electrolysis was then conducted at −1.35 cathode volts for a number of hours, with current declining from 0.029 ampere to 0.013 ampere. The catholyte was separated from the mercury cathode and subjected to gas chromatography, employing decene-1 as the internal standard. The electrolysis had produced 0.314 gram of 1,5-hexadiene, for a 33.5% current efficiency on the 0.0226 Faradays of current employed. The chromatography showed 1.8 grams of allyl chloride in the catholyte, along with a trace of propylene. There was also some allyl chloride in the anolyte. It can be seen that this procedure utilized a cathode voltage less negative than that employed for allyl chloride in Example 3, but more negative than that of allyl bromide in Example 2, indicating that the use of the bromide salt for halide interchange was effective and lowered the required voltage, but that it did not make the allyl chloride solution completely equivalent to an allyl bromide solution.

EXAMPLE 5

An electrolysis was conducted with allyl bromide in the electrolysis cell described in Example 2. The applied voltage was controlled to give a cathode voltage of −1.80 volts (vs. saturated calomel electrode). At this voltage a quaternary ammonium salt can possibly interfere to some extent by protonating an anion intermediate. To avoid this possibility, lithium bromide was employed as electrolyte. The catholyte was 6.05 grams allyl bromide, 0.52 gram LiBr, and dimethylformamide to make 60 ml. The anolyte was 0.65 gram lithium bromide and 1 ml. decene-1 in a 75 ml. dimethylformamide solution. Electrolysis was commenced at −1.8 cathode volts, 0.46 ampere current, and a catholyte temperature of 10°C. Small additional amounts of LiBr and dimethylformamide were added to the anolyte during electrolysis to retard migration. After several hours, the catholyte temperature was allowed to rise to about 20°C. The current over several hours declined to 0.30 ampere, and then gradually over several hours to 0.025 ampere. The catholyte was cooled and analyzed as having 1.82 grams (0.022 mole) 1,5-hexadiene, for a 78% current efficiency of the 0.056 Faradays utilized. It appeared that anodic products diffusing through the frit divider may have had some effect upon current efficiency.

EXAMPLE 6

An electrolysis of allyl bromide was carried out utilizing platinum electrodes and methylene chloride solvent. The electrolysis cell was as described in Example 1, but with a platinum cathode which was a 2 cm. by 2 cm. square. Also a magnetic stirrer was employed in the catholyte rather than a mechanical stirrer. The catholyte was 6.1 grams allyl bromide, 7.4 grams tetraethylammonium bromide, and methylene chloride to make 60 ml. The anolyte was 8 grams of the same salt in methylene chloride to make 60 ml. solution. The electrolysis was commenced at a cathode voltage of −1.0, which was then raised to −1.62 to give a current of 0.014 ampere. The electrolysis was conducted for three hours. For chromatographic analysis, 10% methyl silicone rubber on a ceramic support was utilized, and some difficulty was encountered in separating the 1,5-hexadiene from the methylene chloride and allyl bromide, but a trace of 1,5-hexadiene was isolated.

EXAMPLE 7

The platinum electrodes were employed as in Example 6, but with dimethylformamide as the solvent. The catholyte was 6.1 gram allyl bromide, 10 grams tetraethylammonium p-toluenesulfonate, and dimethylformamide to make 60 ml. The anolyte was 8 grams of the sulfonate salt and 2 grams tetraethylammonium chloride in 60 ml. dimethylformamide solution. At a cathode voltage of −1.00 (vs. saturated calomel electrode) the current was 0.011 ampere. The current was increased to 0.030 ampere at −1.44 cathode volts. There was considerable migration of catholyte to the anode. Samples were withdrawn at intervals for analysis. For chromatography, a silver nitrate/carbowax 20 M (waxy polyethylene glycol) supported on a diatomaceous ceramic was employed. The xylene was employed as an internal standard, and the sample was heated to 100°C. for 1 minute and then gradually raised to 220°C. at 20° per minute. The current efficiency to 1,5-hexadiene for the 6.5 hours electrolysis was 35%, but in one interval the efficiency was 68%.

The potentials at which allyl bromide was reduced at various cathodes was determined. For the determinations, a 0.1 molar solution of tetraethylammonium tetrafluoroborate in dimethylformamide was employed as solvent system with a small amount of allyl bromide. A background determination was made on the solvent system, and a hanging mercury drop was employed for the determination. Results are as indicated below. Two waves were obtained where two values are reported.

| Cathode | ~ $E_{1/2}^1$ | ~ $E_{1/2}^2$ |
| --- | --- | --- |
| Hg | −1.33 | −1.58 |
| Sn | −1.75 | −2.00 |
| Pb | −1.50 | −1.60 |
| Cd | −1.55 | |
| Fe | −2.0 | |
| Ni | −2.1 | |
| Stainless Steel | −1.75 | |
| Zn | 1.50 | −1.60 |
| Cu | −1.4 | |
| Ag | −1.8 | |
| Pt | −2.3 | |
| C | −1.65 | |
| Al | (salt reduced) | |

What is claimed is:

1. A process for the conversion of β-olefinic halides to diolefins which comprises electrolyzing, dehalogenating and coupling such halides at the cathode of an electrolysis cell containing such halides, supporting electolytic salt and a non-aqueous solvent which is not a proton donor, by passing electric current therethrough under conditions and at a cathode potential sufficient to discharge such halides, in which process such halides contain up to 20 carbon atoms and non-interfering substituent groups selected from hydrogen and hydrocarbyl groups and recovering diolefins.

2. The process of claim 1 in which β-alkenyl halides are converted to α, 68 -dienes.

3. The process of claim 1 in which allyl halide is converted to 1,5-hexadiene.

4. The process of claim 1 in which allyl halide is electrolyzed in a divided cell in a catholyte containing a supporting electrolyte salt and a non-aqueous solvent and 1,5-hexadiene is obtained in a yield of at least 75% based on current efficiency.

5. The process of claim 4 in which the cathode potential is such that a predominant amount of the allyl halide is reduced by taking up two electrons.

6. The process of claim 4 in which the allyl halide is allyl chloride and some bromide salt is provided in the catholyte.

7. The process of claim 4 in which the allyl halides electrolyzed in an electrolysis medium consisting of a solvent having a dielectric constant of at least 50 and a quaternary ammonium salt.

8. The process of claim 4 in which the cathode voltage is more negative than $-1.8$ volts (vs. saturated calomel electrode) and a quaternary ammonium salt is employed and there is at most a very minor amount of reduction of the olefinic bonds in the reactant.

9. The process of claim 8 in which a solvent is employed selected from the group consisting of dimethylformamide, acetonitrile and hexamethylphosphoromide, and the electrolysis is conducted at ambient temperature.

10. The process of claim 1 in which a quaternary ammonium salt is present as supporting electrolyte and a solvent is employed selected from the group consisting of dimethyl-formamide, acetonitrile and hexamethylphosphoramide.

11. The process of claim 1 in which the halide is electrolyzed in a non-aqueous solvent having a dielectric constant of at least 50 in the presence of a supporting electrolyte salt.

12. The process of claim 11 in which the supporting salt is a quaternary ammonium salt.

13. The process of claim 1 in which the electrolysis is conducted in the absence of solvents which are proton donors.

14. The process of preparing 1,6-dibromohexane which comprises converting propylene to allyl chloride, electrolyzing the allyl chloride to obtain 1,5-hexadiene, and hydrobrominating by non-Markownikoff addition of hydrogen bromide, to obtain 1,6-dibromohexane is substantial absence of isomers, and in which process the electrolyzing is conducted in accordance with claim 1.

* * * * *